(12) United States Patent
Fujinuma

(10) Patent No.: US 6,203,469 B1
(45) Date of Patent: Mar. 20, 2001

(54) OPERATING APPARATUS FOR USE IN CONNECTION WITH A DUAL-MODE TRANSMISSION

(75) Inventor: Takao Fujinuma, Tokyo (JP)

(73) Assignee: Niles Parts Co., Ltd., Tokyo (JP)

( * ) Notice: Subject to any disclaimer, the term of this patent is extended or adjusted under 35 U.S.C. 154(b) by 0 days.

(21) Appl. No.: 09/393,694

(22) Filed: Sep. 10, 1999

(51) Int. Cl.[7] .............................. F16H 59/74; H01H 3/16; H01H 9/00
(52) U.S. Cl. ................. 477/99; 200/61.27; 200/61.54
(58) Field of Search ................. 477/99; 74/335, 74/336 R; 701/52, 55

(56) References Cited

U.S. PATENT DOCUMENTS

| | | | |
|---|---|---|---|
| 4,379,954 | * 4/1983 | Iwata et al. | 200/4 |
| 5,581,058 | * 12/1996 | Javery et al. | 200/4 |
| 5,854,458 | * 12/1998 | Ramamurthy et al. | 200/61.54 |

FOREIGN PATENT DOCUMENTS 4-2333938 * 4/1994 (DE) .

5-33432 4/1993 (JP) ............................... H01H/25/04

* cited by examiner

*Primary Examiner*—Sherry Estremsky
*Assistant Examiner*—Tisha D. Waddell
(74) *Attorney, Agent, or Firm*—Ronald P. Kananen; Rader, Fishman & Grauer

(57) ABSTRACT

A column-type operating apparatus for an automatic transmission wherein the apparatus is improved in safety by restricting the direction in which the shift lever is operated. An automatic transmission has a shift lever disposed near a steering column of an automobile, the operating apparatus being electrically controllably driven to change the running range of an automatic transmission. In a preferred embodiment, the shift lever includes a rotary knob that is provided at a tip thereof and operated to switch the running range of the automatic transmission. The shift lever has a first shaft rotatably journaled in an inner case and is pivoted about the first shaft in forward and rearward directions. The inner case has a second shaft that is rotatably supported on a case provided to the steering column, and rotates together with the shift lever about the second shaft in upward and downward directions.

10 Claims, 6 Drawing Sheets

OPERATING APPARATUS FOR USE IN CONNECTION WITH A DUAL-MODE TRANSMISSION

FIELD OF THE INVENTION

The present invention relates generally to an operating apparatus for use in connection with a dual-mode transmission. More particularly the present invention relates to an operating apparatus for electrically controlling the switching operation between an automatic (AUT) and manual (MAN) mode position.

BACKGROUND OF THE INVENTION

Japanese Utility Model Preliminary Publication No. 5-33432 discloses an operating apparatus for an automatic transmission. The operating apparatus is provided with switches that are operated at corresponding mode positions. The apparatus is designed to be operated in two directions in order to guide the driver not to improperly operate the transmission. However, the apparatus has no function that inhibits the mix-operation.

An object of the invention is to provide an operating apparatus for an automatic transmission, the apparatus having a column type rotary knob that restricts the direction of operation of a shift lever, thereby inhibiting misoperation.

SUMMARY OF THE INVENTION

The present invention recognizes the disadvantages and limitations commonly associated with the operating apparatus of conventional automatic/manual, i.e., dual-mode, transmissions.

By constructing an operating apparatus for a dual-mode transmission in accordance with an aspect of the present invention, the functionality and maintenance of the transmission system can be improved. Further, the present invention provides a number of advantages over the prior art in addition to significantly reducing the likelihood of mix-operation or misoperation. For instance, the present invention provides a compact shift lever-operating apparatus that can be pivoted in generally upward and downward directions as well as generally forward and rearward directions. At the same time, the present invention also permits a large number of functions to be included in a single shift lever that can be used to perform operations in both the automatic and manual mode. Further, by permitting a switch (such as an A/T switch) to operate when the shift lever is in the automatic mode position, and prohibiting it from operating when the shift lever is in the manual mode position, the operation provides virtually fool-proof operation. Moreover, the present inventions provides the additional advantage of allowing the shift lever to be controlled to pivot to the manual mode position only when the shift lever is in the D (or drive) range in the automatic mode position. The present invention also restricts the instances in which the rotary knob can be rotated, thus preventing, for example, abnormal start of an automobile.

The foregoing improve the operability of column-type shift levers and prevent a significant amount of misoperation of the lever, thus providing an improved measure of safety.

Additionally, when a third stopper, such as one in the shape of a hollow cylinder, is included in the shift lever and a cord is inserted therethrough for connection to a solenoid, the third stopper provides additional protection for the cord and reduces the number of parts and associated assembly time. Thus, the present invention can also lead to improved efficiency and reduce manufacturing time.

In accordance with an aspect of the present invention, an operating apparatus for a dual-mode transmission is provided that includes a rotary knob-equipped shift lever, wherein the shift lever may be disposed near a steering column of an automobile. The operating apparatus is electronically controllable and is capable of changing the running range of a dual-mode transmission. In a preferred embodiment, the shift lever has a rotary knob provided at a tip thereof and a first shaft formed at a base portion thereof. The knob can be operated to switch the running range of an automatic transmission. The first shaft may be rotatably journaled in an inner case with the shift lever being positioned pivotally upward and downward about the first shaft. The inner case includes a second shaft that is rotatably supported on a case provided to the steering column. The inner case is rotatable together with the shift lever about the second shaft in forward and rearward directions.

In a further embodiment of the present invention, the shift lever may include a shaft hollow cylinder through which a shaft is rotatably inserted, the shaft having one end over which the knob is fitted and the other end to which a movable body is fixed, wherein the movable body has a first operating rod that engages an A/T mode switch when the shift lever is at an AUT mode position, and a second operating rod that engages a mode selector switch that detects whether the shift lever is at the AUT mode position or a MAN mode position, wherein the inner case has a third operating rod that operates a manual mode switch when the shift lever is at the MAN mode position.

In a still further embodiment of the present invention, wherein the first operating rod has the first operating rod at an upper portion or a lower portion thereof, the first operating rod engaging an engagement portion of the A/T mode switch when the shift lever is at the AUT mode position, the inner case has a second stopper; wherein when the shift lever is at the MAN mode position, the second stopper abuts the movable body disengaged from the engagement portion to prevent rotation of the movable body.

In yet another embodiment of the present invention, wherein the movable body has a pivot-limiting strap that projects from a lower portion or an upper portion of the movable body toward an inner wall of the inner case, the pivot-limiting strap abutting the first stopper of the inner case to prevent pivotal movement of the inner case when the rotary knob is at any one of P, R, and N ranges and the shift lever is pivoted from the AUT mode position toward the MAN mode position; wherein the pivot-limiting strap permits pivoting of the shift lever from the AUT mode position to the MAN mode position when the rotary knob is at the D range.

In still yet another embodiment of the present invention, wherein the shift lever includes a solenoid fitted to the shaft hollow cylinder through which the shaft is axially mounted, the solenoid includes a plunger that causes a clutch to move so that an engagement portion of the clutch engages and disengages a toothed portion formed in the movable body.

In yet a further embodiment of the present invention, the solenoid is actuated in response to signals generated by a key switch, a stop lamp switch, a vehicle speed sensor, and an engine rotation sensor.

In accordance with another aspect of the present invention, wherein the movable body has a first resiliently-limiting element which is resiliently mounted into a peripheral portion of the movable body and abuts a first groove formed in an inner wall of the shift lever, the shift lever has a second resiliently-limiting element which is resiliently mounted thereto and abuts a second groove formed in the inner wall of the inner case to support the shift lever at the AUT mode position and the MAN mode position. The shift lever has a third resiliently-limiting element that is resiliently mounted to the shift lever and abuts a third groove formed in an inner wall of the case and permits the shift lever to automatically return from an acceleration position and a deceleration position to a neutral position.

In accordance with yet another aspect of the present invention, the case is formed with a cutout so that when the shift lever is pivoted to the AUT mode position, the cutout engages a third stopper formed at a lower portion of the shift lever to prevent the shift lever from being pivoted in forward and rearward directions.

In accordance with still yet another aspect of the present invention, the third stopper of the shift lever is formed in a shape of a hollow cylinder through which a cord is inserted for electrical connection of the solenoid.

BRIEF DESCRIPTION OF THE DRAWINGS

The present invention will be more readily understandable from consideration of the accompanying drawings, wherein.

DETAILED DESCRIPTION OF PREFERRED EMBODIMENTS

Figure 1:
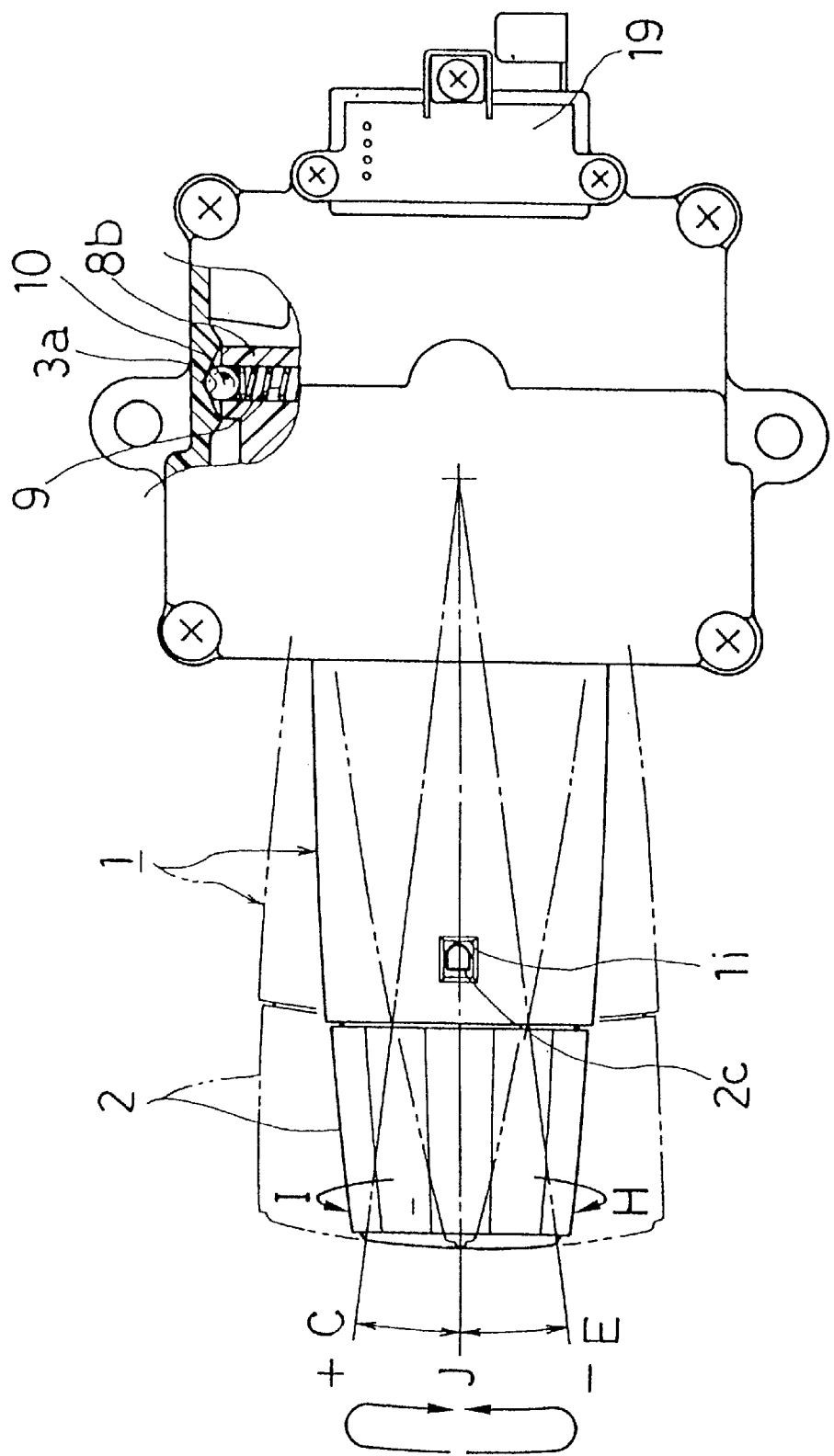
FIG. 1 is a top view of an embodiment of the invention constructed in accordance with the present invention.
Figure 2:
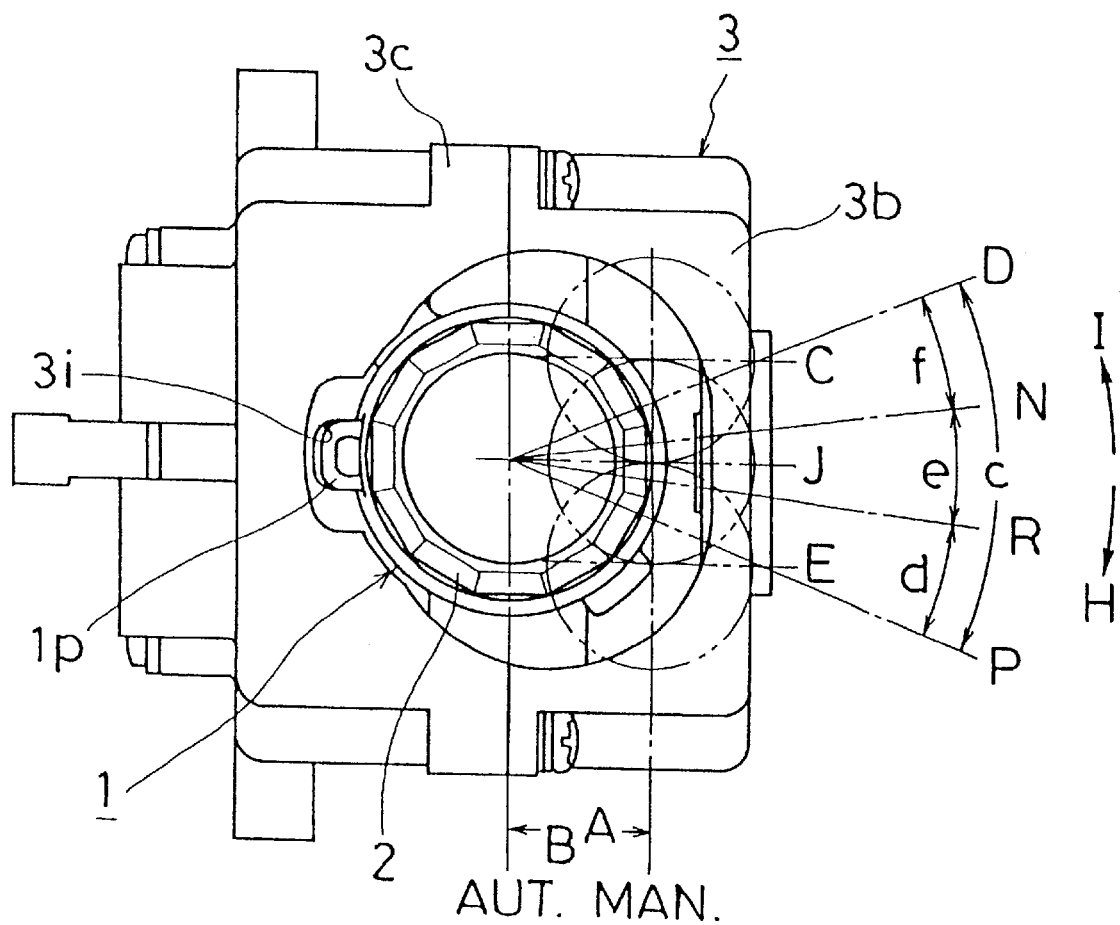
FIG. 2 is a side view of an embodiment of the invention.
Figure 3:
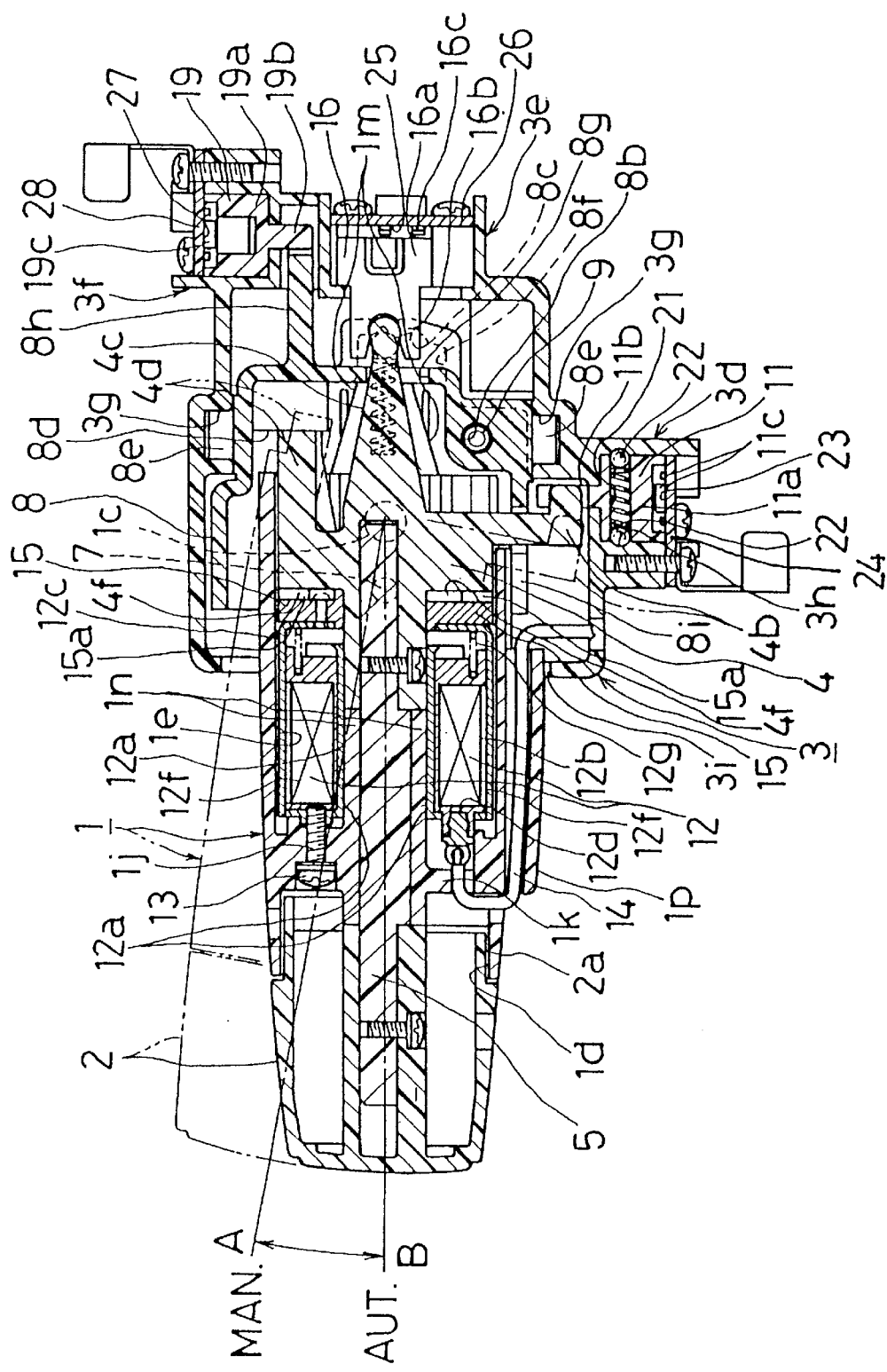
FIG. 3 is a longitudinal cross-sectional view of an embodiment of the invention.
Figure 4:
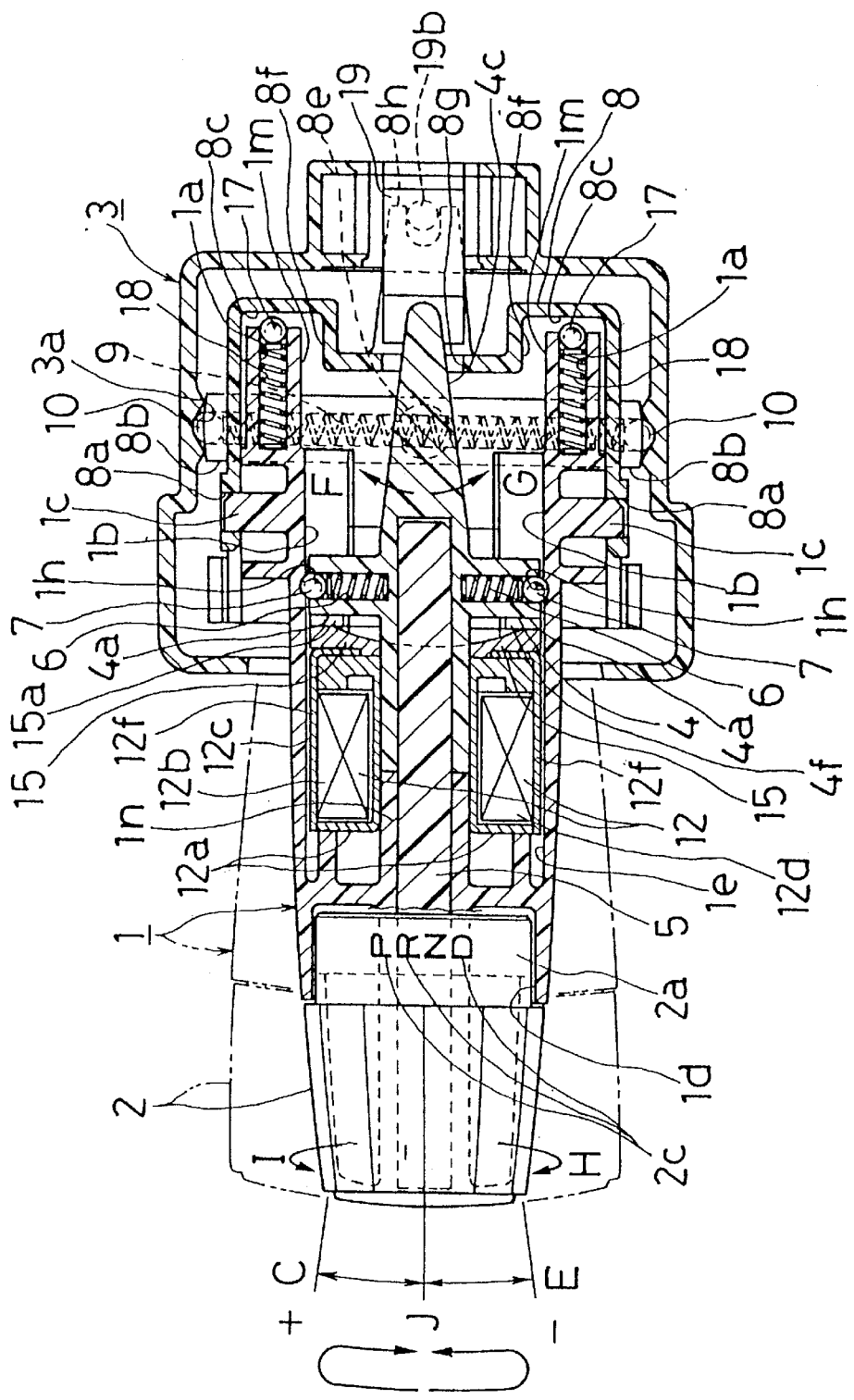
FIG. 4 is a lateral cross-sectional view of an embodiment of the invention.
Figure 5:
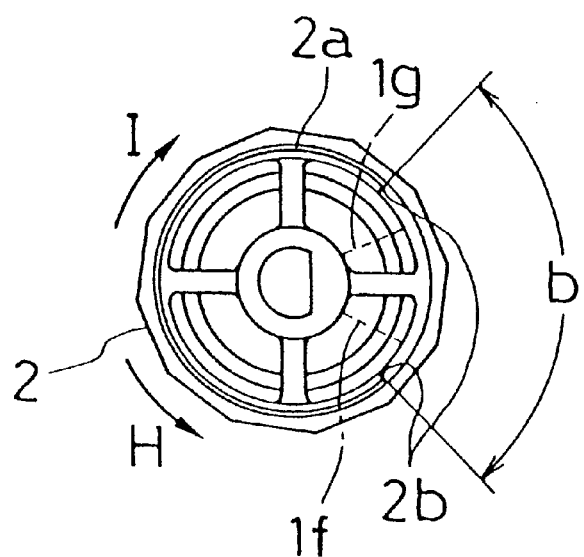
FIG. 5 is a side view of a rotary knob according to an embodiment of the invention.
Figure 6:
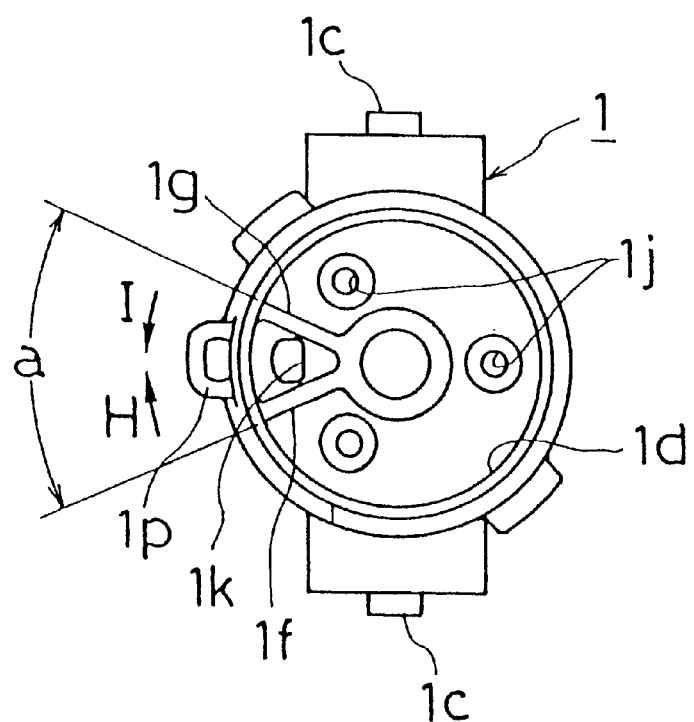
FIG. 6 is a side view of a shift lever according to an embodiment of the invention.
Figure 7:
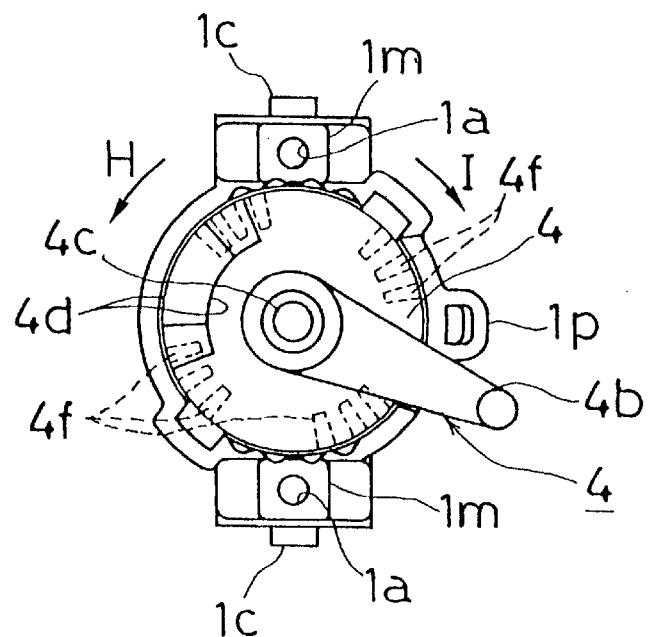
FIG. 7 is a bottom view of a movable body according to an embodiment of the invention.

An embodiment of the present invention is next described in detail with reference to drawing FIGS. 1–8, which form a part of this disclosure. Reference 1 denotes a shift lever for use in a vehicle such as an A/T (automatic transmission) type automobile, the shift lever having a knob 2, preferably of the rotary type, at its end portion. The shift lever is shifted to desired drive positions of, for example, "running" and "parking". As shown in FIG. 4, the shift lever 1 has the rotary knob 2 at one end thereof and projections 1m at upper and lower end portions in the other end. The shift lever 1 also has a movable body 4 and a shaft 5 therein. Each of the projections 1m has a blind hole 1a formed therein. The blind hole 1a accommodates a spring 18 and a second resiliently-limiting element 17. As shown in FIGS. 3 and 4, the shift lever 1 has a knob-side opening 1d at one end thereof and a case-side opening 1e at the other end. The knob-side opening 1d rotatably receives a stepped portion 2a of the rotary knob 2. The case-side opening 1e accommodates a solenoid 12 and a movable body 4. As shown in FIGS. 2, 5, and 6, the rotary knob 2 is formed with a cutout 2b at an end of the stepped portion 2a on the shift lever 1 side. When the knob 2 is rotated from the P (parking) range to the D (drive) range, the end walls of the cutout 2b abut the stoppers 1f and 1g formed on the bottom wall of the knob-side opening 1d, thereby limiting fan angle c, e.g., 45 degrees, through which the knob is rotated. The angle a of the stoppers 1f and 1g is selected to be, for example, 50 degrees as shown in FIG. 6, and the stoppers 1f and 1g are located within the cutout 2b. The angle b of the cutout 2b is, for example, 95 degrees as shown in FIG. 5. Then, the angle c is given by b−a=c, i.e., 45 degrees.

A spring 6 and a first resiliently limiting element 7 lare received in each of holes formed in each of projections 4a of the movable body 4. As the rotary knob 2 is rotated through the angle c as shown in FIG. 2, the spring 6 and first resiliently-limiting element 7 engage corresponding first grooves 1h so that the rotary knob 2 is selectively positioned at the P range, R (reverse) range, N (neutral) range, and D range. In FIG. 2, the angle d through which the rotary knob 2 rotates from the P range to the R range is, for example, 15 degrees. The angle e through which the rotary knob 2 rotates from the R range to the N range is, for example, 15 degrees. The angle f through which the rotary knob 2 rotates from the N range to the D range is, for example, 15 degrees. The first grooves 1h are angularly spaced apart by 15 degrees and receive the first resiliently-limiting elements 7, thereby supporting the rotary knob 2 at the P, R, N, and D ranges.

As shown in FIG. 3, the bottom wall of the knob-side opening 1d is formed with a threaded hole 1j and a through hole 1k. The hole 1j receives the screw 13 that fixes the solenoid 12 disposed on the bottom of the case-side opening 1e. The through hole 1k receives cords 14 therein. The cords 14 pass through the through-hole 1k to electrically connect to the solenoid 12 that is inserted into the case side opening 1e. The screw 13 is used to fix a bobbin 12a of the solenoid 12 to the bottom wall of the case side opening 1e. One end of the cord 14 is connected to the solenoid 12 and the other end of the cord 14 is connected to, for example, a key switch, a stop lamp switch, a vehicle speed sensor, and an engine rotational sensor.

The case 3 is formed with a cutout 3i therein. When the shift lever 1 is pivoted the AUT mode position, the cutout 3i engages a third stopper 1p formed integrally therewith at a lower portion of the shift lever 1 so that the stopper 1p prevents the shift lever 1 from further pivotal motion in the forward and rearward directions. The cords 14 are routed through the cylindrical third stopper 1p.

There is provided on the upper surface of the stepped portion 2a a mark 2c including "D," "N," "R," and "P" which can be seen through a window 1I formed in the shift lever 1. The shaft 5 is rotatably inserted into the shift lever 1. One end of the shaft 5 is screwed to the rotary knob 2 and the other end of the shaft 5 is screwed to the movable body 4.

As shown in FIG. 3, the rotary knob side of the movable body 4 is connected to the solenoid 12 via a clutch 15. The steering shaft (not shown) side of the movable body 4 is formed with a first operating rod 4b, a second operating rod 4c, and a pivot-limiting strap 4d, all being in one piece construction. When the shift lever 1 is at the AUT mode position, the first operating rod 4b engages an engagement portion 11b of a movable plate 11a of an A/T mode switch 11, thereby operating the A/T mode switch 11.

When the shift lever 1 is moved either to the AUT mode position or to the MAN mode position, the second operating rod 4c engages an engagement portion is 16b of a movable board 16a of a mode selector switch 16, thereby causing the mode selector switch 16 to shift to the selected mode position so that the mode selector switch 16 detects a selected mode position. When the rotary knob 2 is at the P range, R range, or N range, if the driver attempts to move the shift lever 1 from the AUT mode position to the MAN mode position, the pivot-limiting strap 4d abuts a first stopper ad formed on the inner wall of an inner case 8 so that the shift lever 1 is prevented from moving from the AUT mode position to the MAN mode position. The pivot-limiting strap 4d permits the shift lever 1 to move from the AUT mode position to the MAN mode position only when the rotary knob 2 is at the D range.

As shown in FIG. 4, the shift lever 1 has first shafts 1c at a base portion 1b thereof, the first shafts 1c being rotatably inserted into bearing holes 8a in the inner case 8. When the rotary knob 2 is at the D range, the shift lever 1 is pivotally supported so that the shift lever 1 can pivot about the first shafts 1c in directions shown by arrows A and B.

Figure 8:
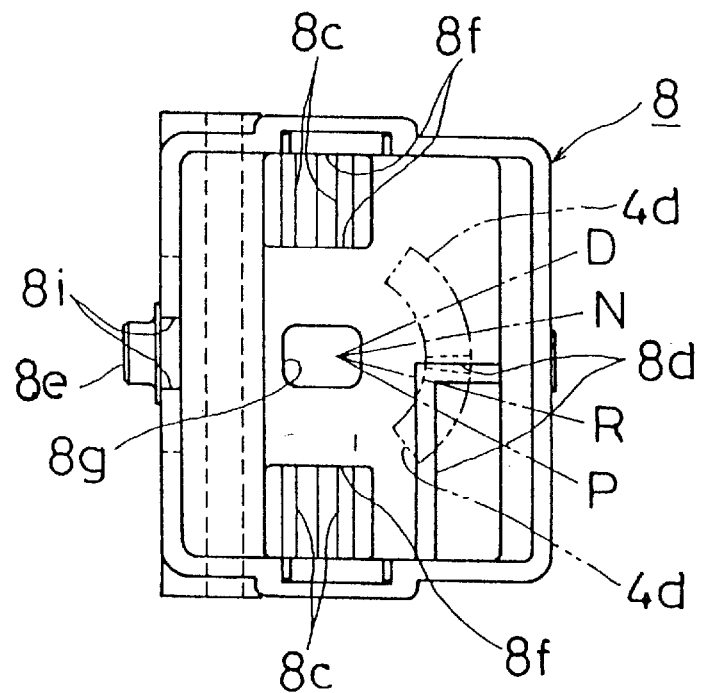
FIG. 8 is a side view of an inner case according to an embodiment of the invention

As shown in FIGS. 4 and 8, the inner case 8 is formed with second grooves 8c on an upper part and a lower part of the bottom wall thereof, each of the second grooves 8c receiving a second resiliently-limiting element 17 urged thereto by a spring 18 so that the shift lever 1 is selectively supported at the AUT mode position and MAN mode position. When the shift lever 1 is operated upward in a direction shown by arrow A, the second resiliently-limiting element 17 engages the second groove 8c to be supported at the MAN mode position. When the shift lever 1 is operated downward in a direction shown by arrow B, the second resiliently-limiting element 17 engages the second groove 8c to be supported at the AUT mode position.

The shift lever 1 is journaled on the inner case 8 so that when the first operating rod 4b of the movable body 4, provided in the shift lever 1, is freed from the engagement portion (operating rod) 11b of the movable board 11a of the A/T mode switch 11, i.e., when the shift lever 1 is shifted to the MAN mode position, the shift lever 1 is pivotally supported such that the shift lever 1 is pivotal about a second shaft Be perpendicular to the first shafts 1c in directions shown by arrows C and E. As shown in FIGS. 1 and 4, the inner case 8 has a hollow cylindrical projection 8b that receives a spring 9 and a third resiliently-limiting element 10 therein. The spring 9 urges the third resiliently-limiting 10 against a third groove 3a in a case 3.

The case 3 is screwed, for example, to the left side of the steering column below a combination switch. The case 3 includes an upper case 3b that forms a rear half and a lower case 3c that forms a front half and matingly fits to the upper case 3b. The case 3 accommodates the A/T mode switch 11, mode selector switch 16, and manual mode switch 19.

As shown in FIG. 4, the inner case 8 has on the upper and lower parts of bottom wall thereof limiting holes 8f into which the tips of upper and lower projections lm of the shift lever 1 loosely fit. With the aforementioned construction, the shift lever 1 is limited its pivotal motion in the upward and downward directions shown by arrows A and B and forward and rearward directions shown by arrows C and E.

The inner case 8 is formed with a through hole 8g in the middle of the bottom wall thereof through which the second operating rod 4c extends. The through hole 8g is as large as the shift lever 1 can pivot in the upward and downward directions shown by arrows A and B and forward and rearward directions shown by arrows C and E. The tip of the second operating rod 4c is of a spherical shape and engages the engagement portion 16b of the mode selector switch 16 at all times. When the shift lever 1 is selectively shifted to the AUT mode position and the MAN mode position, the second operating rod 4c causes the mode selector switch 16 to select a corresponding mode. The selector switch 16 fits in a second switch room Be formed in the outer part of the case 3 and has the engagement portion 16b that projects into the case 3.

Since the case 8 has the upper and lower second shafts 8e journaled in bearing holes 3g, the case 8 is allowed to pivot only in forward and rearward directions shown by arrows F and G when the shift lever 1 is at the MAN mode position. Since the shift lever 1 is journaled with the first shafts 1c fitting in the bearing holes 8a, the shift lever 1 can pivot about the first shaft 1c relative to the inner case 8 in the upward and downward directions shown by arrows A and B only when the rotary knob 2 is at the D range.

The inner case 8 has a second stopper 8i which abuts the first operating rod 4b when the first operating rod 4b moves to the two-dot dash line position shown in FIG. 3 where the first operating rod 4b has moved out of engagement with the engagement portion 11b of the A/T mode switch 11. Thus, when the shift lever 1 is at the MAN mode position, the shift lever 1 is not allowed to rotate in directions shown by arrows I and H.

The shift lever 1 has an acceleration position (+) and 1a deceleration position (−). When the shift lever 1 is at the MAN mode position, the transmission is shifted one level up (+) if the shift lever is operated from the neutral position J in the direction shown by arrow C, and one level down (−) if the shift lever 1 is operated from the neutral position J in the direction shown by arrow E. The shift lever 1 is supported so that the shift lever 1 automatically returns to the neutral position J when shift lever 1 is at the MAN mode position. When the shift lever 1 is at the AUT mode position, the first operating rod 4b engages the A/T mode switch 11 to shift the A/T mode switch 11 as shown FIG. 3.

When the shift lever 1 is operated to the MAN mode position, third resiliently-limiting elements 10 abut third grooves 3a with pressure as shown in FIG. 3 so as to cause the shift lever 1 at the acceleration position (+) and deceleration position (−) to automatically return to the neutral position J. The third resiliently-limiting elements 10 are provided in the left and right inner walls of the case 3.

The A/T mode switch 11 is a slide switch having a movable board 11a. When the shift lever 1 is at the AUT mode position as shown in FIG. 3, the first operating rod 4b engages the engagement portion 11b, thereby moving the movable board 11a to positions corresponding to the P, R, N, and D ranges, respectively. A fourth resiliently-limiting element 22 is urged with a spring 21 and is received in a fourth groove 3h formed in the inner wall surface of a first switch room 3d, so that a movable contact plate 11c of the A/T mode switch 11 is supported at positions where the movable contact plate 11c is in contact with fixed contacts 23 for the respective P, R, N and D ranges. The fixed contacts 23 are provided on a first printed circuit board 24, which is screwed to the case 3 to close the first switch room 3d.

The mode selector switch 16 is in the form of, for example, a slide switch or a seesaw switch. When the shift lever 1 is operated to pivot upward and downward in the directions shown by arrows A and B, the movable board 16a of the mode selector switch 16 slides in the second switch room Be so that the movable contact plate 16c moves into selective contact with the respective fixed contacts 25 corresponding to the AUT mode position and the MAN mode position. The respective fixed contacts 25 are arranged on a second circuit board 26 that is screwed to the case 3 to close the opening of the second switch room 3e. Only when the rotary knob 2 is at the D range, the pivot-limiting strap 4d does not abut the first stopper 8d, so that the shift lever 1 is allowed to pivot from the AUT mode position to the MAN mode position only when the rotary knob 2 is at the D range. When the rotary knob 2 is at the P, R, N, or N ranges, the end surface of the pivot-limiting strap 4d of the movable body 4 is adjacent to the first stopper ad as shown in FIG. 3, so that the shift lever 1 is not allowed to pivot upward in the direction shown by arrow A.

The manual mode switch 19 is in the form of a slide switch or a seesaw switch which operates only when the shift lever 1 is operated in the directions shown by arrows C and E, the mode selector switch 16 detects that the shift lever 1 is at the MAN mode position. An engagement portion 19b of the manual mode switch 19 projects from a movable board 19a and engages a third operating rod 8h formed on the end surface of the inner case 8, so that the engagement portion 19b pivots about the second shaft 8e together with the shift lever 1 and the inner case 8.

When the shift lever 1 is at the MAN mode position and is operated forwardly and rearwardly from the neutral position J in the directions shown by arrows C and E, the movable contact 19c moves into contact with the fixed contacts 27 of the acceleration position (+), thereby shifting the transmission to the acceleration side, or the movable contact 19c moves into contact with the fixed contacts 27 of the deceleration position (−), thereby shifting the transmission to the deceleration side. The manual mode switch 19 is electrically connected to the automatic transmission. The fixed contacts 27 are arranged on the third circuit board 28 that is screwed to the case 3 to close the opening of the third switch room 3f.

The solenoid 12 includes a fixed portion 12d that fits into the shift lever 1, a movable portion 12f that is moved by the force of the electromagnet through the shift lever 1, and a return spring 12g that is disposed between the fixed portion 12d and the movable portion 12f. The fixed portion 12d includes a bobbin 12a that fits over a shaft hollow cylinder in of the shift lever 1, and a coil 12b that is wound around the bobbin 12a. The movable portion 12f includes a clutch 15 having an engagement portion 15a that moves into and out of engagement with a toothed portion 4f formed in the end surface of the movable body 4 closer to the rotary knob 2, and a cup-shaped plunger 12c to which the clutch 15 is fixedly mounted.

The solenoid 12 is a member that limits the rotation of the rotary knob 2. When the engagement portion 15a of the solenoid 12 is disengaged from the toothed portion 4f of the movable body 4, the rotary knob 2 is allowed to rotate to the respective positions. When a current flows through the coil 12b, the clutch 15 causes the plunger 12c to move, thereby bringing the movable body 4 into a locked condition or out of the locked condition. The solenoid 12 may be an electrically-powered apparatus such as an electric motor. The solenoid 12 operates in response to signals from, for example, a key switch, a stop lamp switch, a vehicle speed sensor, and an engine rotation sensor.

The examples of condition in which the solenoid 12 is operated are as follows:

|   | Key switch | Stop-lamp switch | Vehicle speed sensor | Engine rotation sensor |
|---|---|---|---|---|
| P | o | o | | |
| R | o | o | o | |

-continued

|   | Key switch | Stop-lamp switch | Vehicle speed sensor | Engine rotation sensor |
|---|---|---|---|---|
| N | | o | | o |
| D | | | | |

The above list indicates that when the rotary knob 2 is at the P range, if the key switch and stop lamp switch are ON, the solenoid 12 is actuated allowing the rotary knob 2 to move to the R range. Therefore, when the rotary knob 2 is at the R range, if the key switch and stop lamp switch are detected to be ON and the vehicle speed sensor detects that the vehicle is running at a speed less than a predetermined speed, then the solenoid 12 is actuated allowing the rotary knob 2 to move to the P range. Also, when the rotary knob 2 is at the N range, if the stop lamp switch is detected to be ON and the engine rotational speed is less than a predetermined value, the solenoid 12 is actuated allowing the rotary knob to move to the R range.

The present invention of the aforementioned construction operates in the following manner.

With the operating apparatus for an automatic transmission according to the embodiment of the present invention, when the driver holds the rotary knob 2 in his hand and operates the rotary knob 2 to select one of the P. R. N. and D ranges at the AUT mode position, the A/T mode switch 11 is shifted to appropriate positions so that electrical signals corresponding to the respective positions are sent to the transmission. Thus, the electrical signals are used to automatically change the speed of the engine.

With the clutch type locking mechanism in which the engagement portion 15a of the solenoid 12 engages the toothed portion 4f of the movable body 4, the mechanism is provided with the solenoid 12 which is actuated by signals generated by the key switch, stop lamp switch, vehicle sensor, engine rotation sensor and the like. When the solenoid 12 is actuated by the signals to move the plunger 12c connected to the clutch 15, the engagement portion 15a is disengaged from the toothed portion 4f, thereby preventing rotation of the rotary knob 2. This construction permits the rotary knob 2 to rotate to the respective positions in the AUT mode position.

The rotary knob 2 is rotatable together with the movable body 4 about the shaft 5 in directions shown by arrows H and I. If the shift lever 1 in the AUT mode position is pivoted upward in the direction shown by arrow A only when the rotary knob 2 is at the D range, the shift lever 1 moves into the MAN mode position allowing the driver to manually operate the transmission.

When the shift lever 1 is in the AUT mode position and at one of the P, R, and N ranges, the rotary knob 2 is at a position at which the tip of the pivot-limiting strap 4d of the movable body 4 is adjacent to and overlaps the first stopper 8d as shown in FIG. 3 and 8. When the shift lever 1 is at the AUT mode position, if the driver attempts to pivot the shift lever 1 in the direction shown by arrow A, the tip of the pivot-limiting strap 4d abuts the surface of the first stopper 8d to prevent the shift lever 1 from being pivoted to the MAN mode position.

When the shift lever 1 is at the AUT mode position, if the driver attempts to pivot the shift lever 1 forward and rearward in the directions shown by arrows C and E, a third stopper 1p formed at the lower end of the shift lever 1 abuts the cutout 3i of the case 3, thereby preventing the shift lever 1 from being operated in the direction of the acceleration position (+) or the deceleration position (−).

When the shift lever 1 is at the MAN mode position, the shift lever 1 is allowed to pivot in the direction of the acceleration position (+) or the deceleration position (−). At the same time, the shift lever 1 is pivoted to the acceleration position (+) or the deceleration position (−), the shift lever 1, movable body 4, and inner case 8 pivot about the second shaft Be in the directions shown by arrows C and E, so that the third operating rod 8h operates the manual mode switch 19 to shift in the direction of the acceleration position (+) or to the deceleration position (−).

For example, when the shift lever 1 is at the MAN mode position, if the shift lever 1 is pivoted from the neutral position in the direction of the acceleration position (+), the transmission is shifted from speed I to speed II. Further pivoting the shift lever 1 in the direction of acceleration position (+) causes the transmission to be shifted to speed III, speed IV, and speed V, sequentially. Pivoting the shift lever 1 from the speed V in the direction of deceleration position (−) causes the transmission to be sequentially shifted to speed IV, speed III, speed II, and speed I, thereby returning to the position at which the transmission was previously.

When the shift lever 1 is at the MAN mode position, the mode selector switch 16 is shifted to the MAN mode. The first operating rod 4b disengages from the engagement portion 11b of the A/T mode switch 11 to engage the second stopper 8i as shown by phantom lines in FIG. 3, so that the A/T mode switch 11 holds the rotary knob 2 at the D range.

Although certain preferred embodiments of the present invention have been described, the invention is not limited to the illustrations described and shown herein, which are deemed to be merely illustrative of the best modes of carrying out the invention. A person of ordinary skill in the art will realize that certain modifications will come within the teachings of this invention and that such modifications are within its spirit and the scope as defined by the claims.

What is claimed is:

1. An operating apparatus suitable for controlling the switching operation between modes of a transmission of a vehicle having a steering column, the apparatus comprising:

a shift lever disposed near the steering column of a vehicle, said shift lever including a tip and a base portion and further including a knob provided at the tip thereof that is operated to switch the running range of the transmission and a first shaft formed at the base thereof that is rotatable, journaled in an inner case, wherein said shift lever generally pivots upward and downward about said first shaft, and wherein said inner case includes a second shaft that is rotatably supported on a case provided to the steering column, said inner case being rotatable together with said shift lever about said second shaft in a generally forward and rearward direction; and wherein said shift lever has a shaft hollow cylinder through which a shaft is rotatably inserted, said shaft having one end over which said knob is fitted and the other end to which a movable body is fixed, said movable body having a first operation rod that engages an A/T mode switch when said shift lever is at an automatic mode position and a second operating rod that engages a mode selector switch to detect the mode position, wherein said inner case includes a third operating rod that operates a manual mode switch when said shift lever is in the manual mode position.

2. An operating apparatus as recited in claim 1, wherein the knob is of the rotary type.

3. An operating apparatus as recited in claim 1, wherein the operating apparatus changes the running range of the transmission by electronic control.

4. The operating apparatus as recited in claim 1, wherein said movable body has an upper portion and a lower portion and the first operating rod is connected to said movable body and engages an engagement portion of the A/T mode switch when said shift lever is at the automatic mode position, and further wherein said inner case has a second stopper that abuts said first operating rod when said shift lever is in the manual position and said first operating rod is disengaged from the engagement portion to prevent rotation of the movable body.

5. The operational apparatus as recited in claim 1, wherein said movable body includes a pivot-limiting strap that projects from the movable body toward an inner wall of said inner case, said pivot-limiting strap abutting the first stopper of said inner case to prevent pivotal movement of said inner case when the rotary knob is at any one of P, R, and N ranges and said shift lever is pivoted from the automatic mode position toward the manual mode position, wherein the pivot-limiting strap permits pivoting of said shift lever from the automatic mode position to the manual mode position when the rotary knob is at the D range.

6. The operational apparatus as recited in claim 1, wherein said shift lever includes a solenoid fitted to the shaft hollow cylinder through which the shaft is axially mounted, the solenoid having a plunger that causes a clutch to move so that an engagement portion of the clutch engages and disengages a toothed portion formed in the movable body.

7. The operational apparatus as recited in claim 6, wherein said solenoid is actuated in response to signals generated by a key switch, a stop lamp switch, a vehicle speed sensor, and an engine rotation sensor.

8. The operational apparatus as recited in claim 1, wherein said movable body includes a first-resiliently-limiting element which is resiliently mounted into a peripheral portion of the movable body and abuts a first groove formed in an inner wall of said shift lever;

wherein said shift lever includes a second resiliently limiting element which is resiliently mounted thereto and abuts a second groove formed in the inner wall of said inner case to support the shift lever at the automatic mode position and the manual mode position;

wherein said shift lever has a third resiliently limiting element that is resiliently mounted to the shift lever and abuts a third groove formed in an inner wall of the case and permits said shift lever to automatically return from an acceleration position and a deceleration position to a neutral position.

9. The operational apparatus as recited in claim 1, wherein the case is formed with a cutout, wherein when said shift lever is pivoted to the automatic mode position, the cutout engages a third stopper formed at a lower portion of said shift lever to prevent said shift lever from being pivoted in forward and rearward directions.

10. The operational apparatus as recited in claim 9, wherein the third stopper of said shift lever is formed in a shape of a hollow cylinder through which a cord is inserted for electrical connection of the solenoid.

* * * * *